(12) United States Patent
Kobilka et al.

(10) Patent No.: US 11,279,816 B2
(45) Date of Patent: Mar. 22, 2022

(54) FLAME RETARDANTS DERIVED FROM BIOBASED DICARBOXYLIC ACIDS

(71) Applicant: International Business Machines Corporation, Armonk, NY (US)

(72) Inventors: Brandon M. Kobilka, Fishkill, NY (US); Jason T. Wertz, Pleasant Valley, NY (US); Jacob Porter, Highland, NY (US); Scott B. King, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 16/444,611

(22) Filed: Jun. 18, 2019

(65) Prior Publication Data

US 2020/0399440 A1 Dec. 24, 2020

(51) Int. Cl.

| | |
|---|---|
| *C08K 5/5313* | (2006.01) |
| *C08K 3/016* | (2018.01) |
| *C08L 25/06* | (2006.01) |
| *C08L 35/02* | (2006.01) |
| *C08L 33/24* | (2006.01) |
| *C08L 63/00* | (2006.01) |
| *C07F 9/09* | (2006.01) |
| *C08K 5/5337* | (2006.01) |
| *C08K 5/092* | (2006.01) |
| *C08L 75/06* | (2006.01) |
| *C08L 75/02* | (2006.01) |

(52) U.S. Cl.
CPC .............. *C08K 5/5337* (2013.01); *C07F 9/09* (2013.01); *C08K 3/016* (2018.01); *C08K 5/092* (2013.01); *C08K 5/5313* (2013.01); *C08L 25/06* (2013.01); *C08L 33/24* (2013.01); *C08L 35/02* (2013.01); *C08L 63/00* (2013.01); *C08L 75/02* (2013.01); *C08L 75/06* (2013.01); *C08L 2201/02* (2013.01)

(58) Field of Classification Search
CPC ............ C08K 5/49–5399; C09K 21/12; C07F 9/02–6596
See application file for complete search history.

(56) References Cited

U.S. PATENT DOCUMENTS

| | | | | |
|---|---|---|---|---|
| 3,376,274 A | * | 4/1968 | Boyer | ...................... C08F 30/02 526/278 |
| 5,002,996 A | | 3/1991 | Okuda et al. | |
| 5,650,531 A | * | 7/1997 | Chang | .................... C07F 9/3211 558/160 |
| 5,665,801 A | * | 9/1997 | Chang | ................ C08G 63/6928 252/601 |
| 9,274,414 B2 | * | 3/2016 | Liu | ........................... G03F 1/00 |
| 9,822,208 B1 | * | 11/2017 | Kobilka | ............... C07F 9/65515 |
| 10,113,063 B2 | | 10/2018 | Jung et al. | |
| 10,301,406 B2 | * | 5/2019 | Czaplewski | ............. C07C 51/36 |
| 10,301,435 B2 | * | 5/2019 | Czaplewski | ......... C08G 81/027 |
| 10,301,436 B2 | * | 5/2019 | Czaplewski | ........ C07F 9/65515 |
| 2004/0053061 A1 | * | 3/2004 | Yonezawa | ............... B32B 15/08 428/458 |
| 2007/0293692 A1 | * | 12/2007 | Pirrung | ..................... C09D 7/45 558/70 |
| 2013/0004439 A1 | * | 1/2013 | Fournial | ................. A61P 17/00 424/59 |
| 2016/0244607 A1 | | 8/2016 | Kagumba et al. | |
| 2017/0210689 A1 | | 7/2017 | Reno et al. | |
| 2019/0077953 A1 | | 3/2019 | Jung et al. | |
| 2020/0259205 A1 | * | 8/2020 | Azagarsamy | ......... C08F 130/02 |

FOREIGN PATENT DOCUMENTS

| | | |
|---|---|---|
| CN | 103304883 B | 10/2015 |
| CN | 103146189 B | 11/2015 |
| CN | 108795033 A | 11/2018 |
| JP | 2006298771 A * | 11/2006 |
| WO | 98/24837 A1 | 6/1998 |

OTHER PUBLICATIONS

Machine Translation of JP2006-298771A. Nov. 2, 2006. (Year: 2006).*
James. Opening of Epoxides with Acid. Master Organic Chemistry. https://www.masterorganicchemistry.com/2015/02/02/opening-of-epoxides-with-acid/. As viewed on Nov. 19, 2016 via web.archive.org (The Wayback Machine). (Year: 2016).*
Weil, Edward D. Phosphorus-Containing Polymers and Oligomers. Encyclopedia of Polymer Science and Technology. John Wiley & Sons, Inc. First published Oct. 22, 2001. (Year: 2001).*
"Additional Structure Search," Sci Finder Results, received: Feb. 8, 2019, 8 pages.
"Substances Disclosed in Novel Fire Retardant Intumescent Coatings," Sci Finder Results, received: Feb. 8, 2019, 5 pages.
"Substances From Maleic and Fumaric Acid," Sci Finder Results, received: Feb. 8, 2019, 2 pages.
"Substances Related to Phenyl Succinic Acid," Sci Finder Results, received: Feb. 8, 2019, 1 page.
"Succinc Acid FRs," Sci Finder Results, received: Feb. 8, 2019, 1 page.
"Vinyl Search," Sci Finder Results, received: Feb. 8, 2019, 2 pages.

* cited by examiner

*Primary Examiner* — Stephen E Rieth
(74) *Attorney, Agent, or Firm* — Kelsey M. Skodje (57) ABSTRACT

A biobased flame retardant, a process for forming a biobased flame retardant, and an article of manufacture. The flame-retardant compound includes at least one moiety derived from a biobased dicarboxylic acid and at least one organophosphorus moiety. The process includes providing an organophosphorus compound and malic acid or a hydroxylated derivative of a biobased dicarboxylic acid. The process also includes reacting the organophosphorus compound and the malic acid or hydroxylated derivative to form a flame retardant. The article of manufacture includes a polymer and an organophosphorus flame retardant derived from a biobased dicarboxylic acid.

19 Claims, 8 Drawing Sheets

1. HPO(OR)$_2$, ~ 140 °C, cat. Na
2. SOCl$_2$, ~ 0 °C – RT

620

510    E—OH    NEt$_3$, DCM

PO(OR)₂Cl,
NEt₃,
DCM

FLAME RETARDANTS DERIVED FROM BIOBASED DICARBOXYLIC ACIDS

BACKGROUND

The present disclosure relates to flame-retardant compounds and, more specifically, biobased organophosphorus flame retardants.

Flame retardants in polymers can be broadly classified as additive or reactive. Additive flame retardants are blended with the polymer, while reactive flame retardants are covalently bound to the polymer chain. Additive flame retardants are mixed into polymers during blending, curing, foaming, extrusion, or other processing techniques. Reactive flame retardants are bound at sites along the polymer chain, incorporated into the chain as monomer units, and/or used as cross-linkers.

SUMMARY

Various embodiments are directed to a flame-retardant compound. The flame-retardant compound includes at least one moiety derived from a biobased dicarboxylic acid and at least one organophosphorus moiety. The biobased dicarboxylic acid can be malic, fumaric, succinic, or maleic acid. At least one of the organophosphorus moieties can have a reactive functional group such as an aldehyde, a halide, an epoxy, a carboxylate, a vinyl, a propylene carbonate, an imine, an imide, an amine, an amide, or a thiol. Further, at least one of the organophosphorus moieties can have the formula where R and R' are organic substituents. In some embodiments, at least one of R and R' is an alkyl, methyloxirane, allyl, or propylene carbonate substituent.

Additional embodiments are directed to a process, which includes providing malic acid or a hydroxylated derivative of a biobased dicarboxylic acid. The process also includes providing an organophosphorus compound, and reacting the organophosphorus compound and the malic acid or hydroxylated derivative to form a flame retardant. The organophosphorus compound can be a chlorophosphate ester, a phosphonate ester, a phosphinate ester, or phosphorus oxychloride. The hydroxylated derivative can be a mono-, di-, tri-, or tetrahydroxy derivative. The process can also include polymerizing the flame retardant, blending the flame retardant with a polymer, or covalently binding the flame retardant to a polymer. In some embodiments, the process can include carrying out a reaction involving at least one functional group on the reactive flame retardant.

Further embodiments are directed to an article of manufacture. The article of manufacture includes a polymer and a flame-retardant compound. The flame-retardant compound includes at least one moiety derived from a biobased dicarboxylic acid and at least one organophosphorus moiety. The article of manufacture can also include an electronic component. The polymer can be polystyrene, epoxide resin, polyhydroxyurethane, polycarbonate, polyester, polyacrylate, polyimide, polyamide, polyurea, or a poly(vinyl-ester). In some embodiments, the flame retardant is an additive flame retardant. The flame retardant can be covalently bound to the polymer. In addition, the flame retardant can be a monomer unit in the polymer.

DETAILED DESCRIPTION

Flame retardants are added to a wide variety of materials in order to ensure safety and protect the materials from damage. Common examples of flame retardants include organophosphorus flame retardants and organohalide flame retardants. Examples of materials that often include flame-retardant additives include plastics, paints, coatings, foams, adhesives, synthetic fibers, insulation, and synthetic rubbers. Many of these materials are incorporated into electronics hardware (e.g., printed circuit boards (PCBs), integrated circuit packages, semiconductors, transistors, optoelectronics, capacitors, resistors, chip carriers, housings, etc.). For example, resins for PCBs can be made flame retardant by incorporating polymers (e.g., epoxy resins, polyhydroxyurethane, polycarbonate, polyester, polyacrylate, polyimide, polyamide, polyurea, and/or poly(vinyl-ester) polymers) combined with flame retardants. In other examples, flame retardants are blended into synthetic fibers used in items such as clothing, acoustic dampening materials, cushioning, furniture, insulation, curtains, and carpets.

Organophosphorus flame retardants can be additive or reactive, depending upon the reactivity of functional groups present on the molecules. That is, reactive flame retardants include functional groups capable of forming covalent bonds at one or more sites in a polymer matrix, being incorporated into the chain as co-monomers, and/or being used as cross-linkers. Flame-retardant polymers can also be formed by polymerizing reactive flame retardants. Additive flame retardants are blended into polymers without binding. Additive flame retardants do not include functional groups that will readily bind to the polymer matrix. Examples of both reactive and unreactive functional groups are discussed in greater detail below.

These flame retardants have traditionally been derived from petrochemicals. However, there are advantages to increasing biorenewable content in polymers by using flame retardants derived from biobased sources (e.g., biomass). For example, there is greater variety in the reactivity and other properties of biobased compounds than from petrochemical compounds. Therefore, using biorenewable sources enables the production of more diverse materials with tunable properties. Further, using biobased compounds conserves the Earth's supply of petroleum, which is a non-renewable resource. Biobased compounds can also be obtained with less energy expenditure than petrochemical-derived compounds (e.g., without the drilling, extraction, refining, and processing required to produce them from petrochemicals).

According to the present disclosure, organophosphorus flame retardants derived from biobased dicarboxylic acids are formed. These flame retardants are referred to herein as "biobased flame retardants." Flame-retardant materials (e.g., polymers) that include the biobased flame retardants are disclosed as well. The biobased dicarboxylic acids include fumaric acid (trans-butenedioic acid), maleic acid (cis-butenedioic acid), succinic acid (butanedioic acid), and malic acid (2-hydroxysuccinic acid). These can be reacted to form hydroxylated derivatives. The biobased flame retardants are formed in reactions to replace hydroxyl hydrogen atoms on biobased dicarboxylic acids or derivatives ("biobased compounds") with organophosphorus moieties. The biobased flame retardants can then be incorporated into polymers as additive or reactive flame retardants, depending upon which functional groups are present on the flame retardants. Additionally, flame-retardant polymers can be formed by polymerization of the biobased flame retardants in some embodiments.

Figure 1:
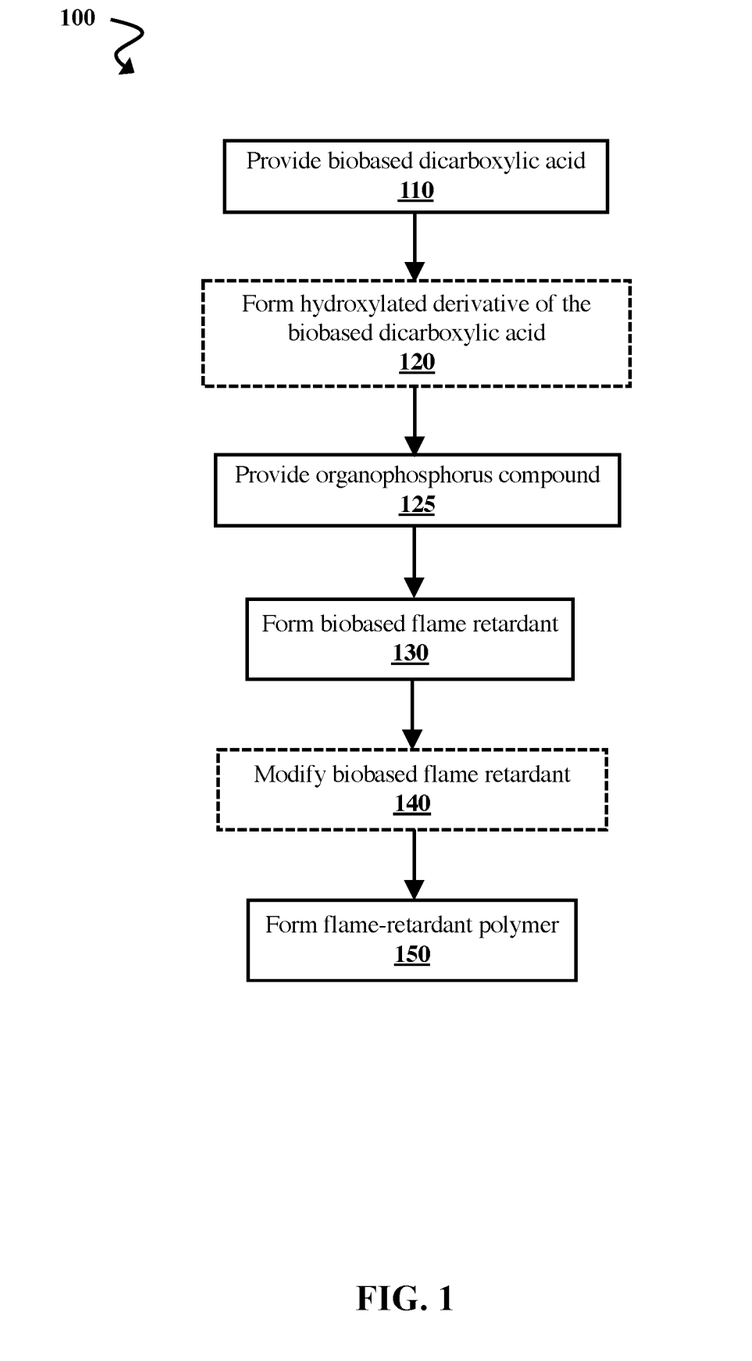
FIG. 1 is a flow diagram illustrating a process of forming a flame-retardant polymer, according to some embodiments of the present disclosure.
Figure 2:
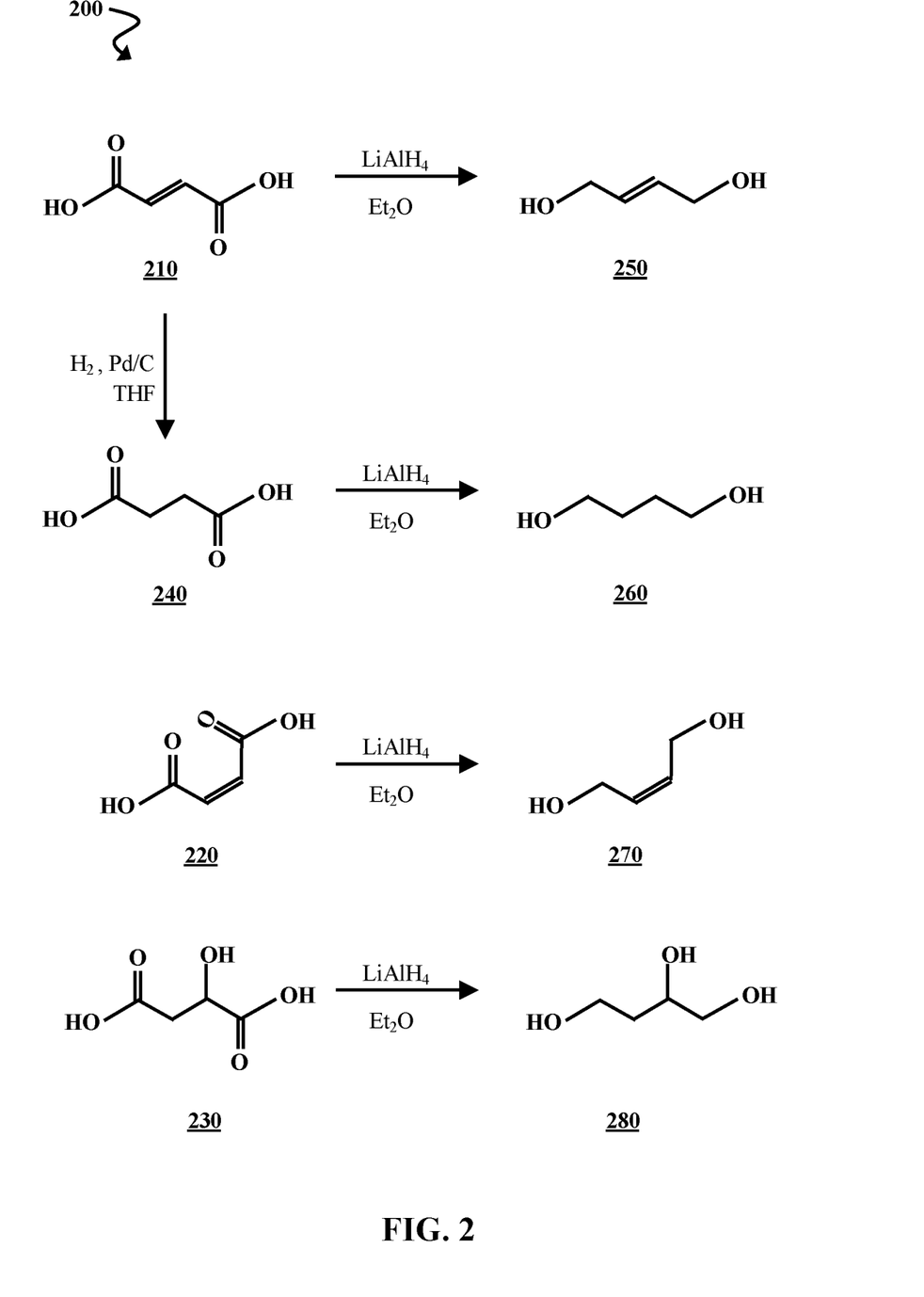
FIG. 2 is a chemical reaction diagram illustrating processes of forming di- and trihydroxy derivatives of biobased dicarboxylic acids, according to some embodiments of the present disclosure.

FIG. 1 is a flow diagram illustrating a process 100 of forming a flame-retardant polymer, according to some embodiments of the present disclosure. Biobased dicarboxylic acid is provided. This is illustrated at step 110. The provided biobased dicarboxylic acid can include succinic acid, malic acid, fumaric acid, maleic acid, or a mixture including two or more of these acids. Structures of these biobased dicarboxylic acids are illustrated in FIG. 2. These biobased dicarboxylic acids are naturally present in a variety of plant and animal sources (e.g., broccoli, rhubarb, sugar beets, fresh meat extracts, various cheeses, etc.), and are intermediates in the tricarboxylic acid (TCA) cycle.

On an industrial scale, the biobased dicarboxylic acids can be obtained by fermentation of carbon sources such as glucose from biomass (e.g., food waste, wheat, unrefined sugar, etc.). For example, succinic acid can be produced by fermentation carried out by obligate anaerobes (e.g., *Anaerobiospirillum succiniciproducens* and *Actinobacillus succinogenes*), metabolically engineered strains of *Escherichia coli*, or other organisms (e.g., *Saccharomyces cerevisiae* or *Basfia succiniciproducens*). Maleic acid can be obtained by aerobic fermentation of furfural from biomass. Malic and fumaric acids can be produced anaerobically by fungi from the genus *Rhizopus* (e.g., *R. arrhizus* or *R. oryzae*). Malic and/or succinic acid can also be produced by *Aspergillus flavus*. Further, malic acid can be synthesized by hydration of maleic or fumaric acid.

The biobased dicarboxylic acids can then be reacted to form hydroxylated derivatives. This is illustrated at step 120.

Figure 3:
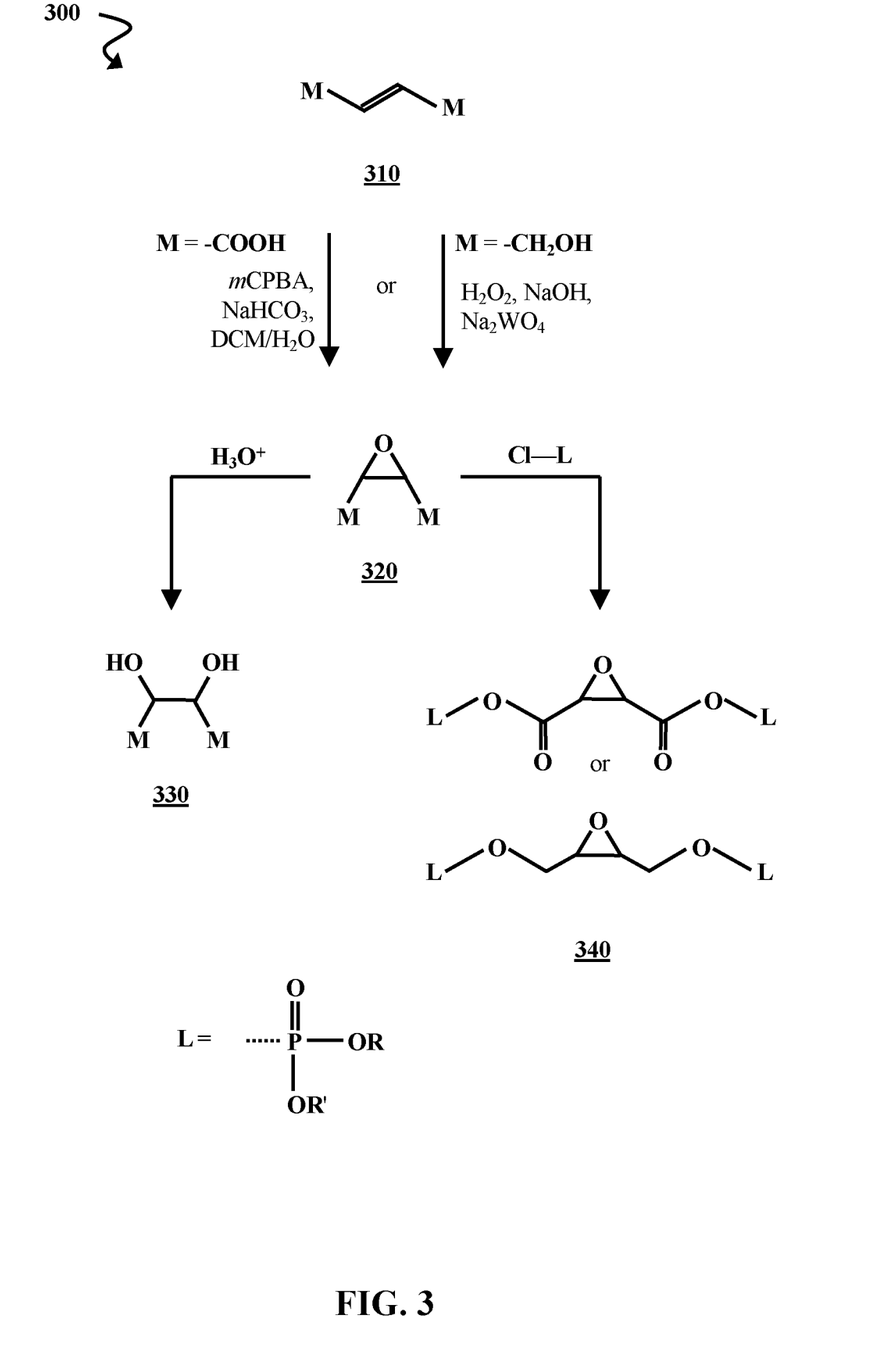
FIG. 3 is a chemical reaction diagram illustrating processes of forming biobased flame retardants according to some embodiments of the present disclosure.
Figure 4A:
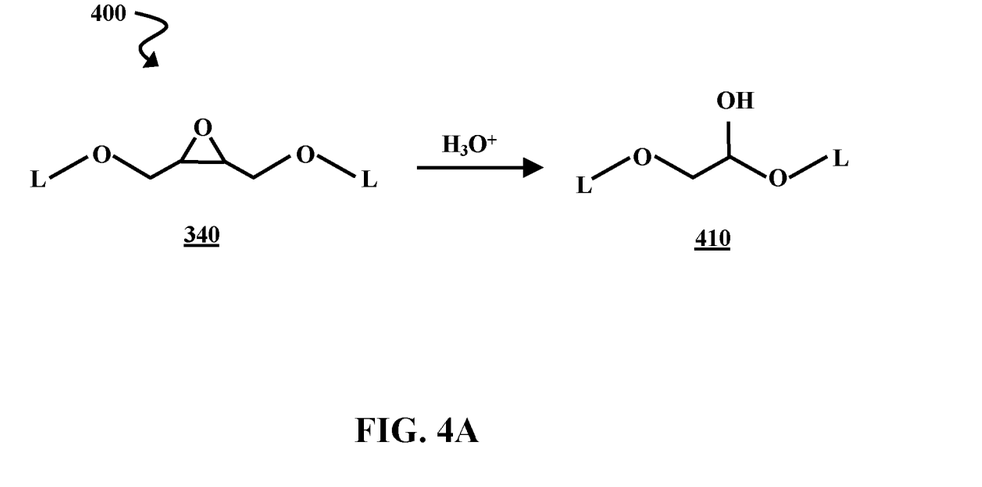
FIGS. 4A and 4B are chemical reaction diagrams illustrating processes of forming a monohydroxy biobased flame retardant, according to some embodiments of the present disclosure.
Figure 4B:
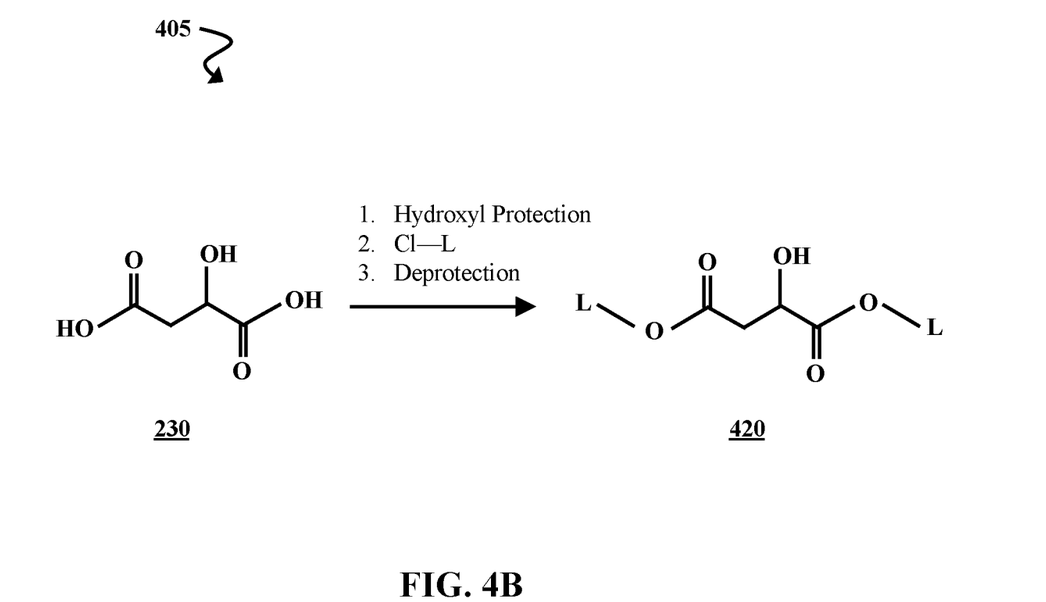

The derivatives include mono-, di-, tri-, or tetrahydroxy derivatives. However, polyhydroxy derivatives having more than four hydroxyl groups may be formed in some embodiments (e.g., by attaching substituents with additional hydroxylated functionalities to a polyhydroxy derivative). Reactions to form di- and trihydroxy derivatives are illustrated in FIG. 2, and reactions to form di- and tetrahydroxy derivatives are illustrated in FIG. 3. Flame-retardant monohydroxy derivatives can also be formed. This is illustrated in FIGS. 4A and 4B. In some embodiments, step 120 is not carried out. For example, a monohydroxy biobased dicarboxylic acid (e.g., malic acid) can optionally be used in subsequent steps without further hydroxylation. This is discussed in greater detail below.

An organophosphorus compound is provided. This is illustrated at step 125. In some embodiments, the organophosphorus compounds are disubstituted chlorophosphate esters (organophosphates), phosphonate esters (organophosphonates), phosphinate esters, or phosphorus oxychloride ($POCl_3$). However, any appropriate compound that can provide flame-retardant organophosphorus moieties can be used in other embodiments (e.g., 9,10-dihydro-9-oxa-10-phosphaphenanthrene-10-oxide (DOPO) or 5,5-dimethyl-[1,3,2]dioxaphosphinane-2-oxide (DDPO)). The organophosphorus compounds can be obtained from commercial sources, research institutions, or synthesized in situ.

The organophosphates and organophosphonates can be represented, respectively, by the following formulas:

where X is a halogen atom (e.g., chlorine (Cl) or bromine (Br)) and where R and R' are independently selected from a variety of organic substituents.

Examples of R and R' substituents can include alkyl groups. Herein, "alkyl group" refers to $C_1$-$C_{100}$ radicals, which can be linear, branched, or cyclic. Examples of alkyl groups that may be used include methyl, ethyl, n-propyl, iso-propyl, n-butyl, iso-butyl, sec-butyl, tert-butyl, pentyl, hexyl, octyl, cyclopropyl, cyclobutyl, cyclopentyl, cyclohexyl, cyclooctyl, and their substituted analogues. As used herein, the term "substituted" indicates that a hydrogen atom has been replaced with a carbon atom, a heteroatom, or a heteroatom-containing group. For example, a "substituted hydrocarbyl" is a radical made of carbon and hydrogen where at least one hydrogen is replaced by a carbon atom (e.g., in a substituent such as allyl, methyl, methyloxirane, carboxylate, propylene carbonate, etc.) or a heteroatom (e.g., as a fluorine, chlorine, bromine, iodine, oxygen, or nitrogen atom or in a substituent such as hydroxyl, amine, sulfhydryl, alkoxy, carboxylate, propylene carbonate, methyloxirane, thioether, or ether).

When cyclic, the alkyl groups can be aromatic or non-aromatic. Herein, the term "aromatic" also refers to pseudo-aromatic heterocycles, which are heterocyclic substituents that have similar properties and structures (nearly planar) to aromatic heterocyclic ligands, but are not by definition aromatic. Examples of cyclic aromatic alkyls (referred to herein as "aryl groups") that can be used can include six-carbon aromatic rings (phenyl) and substituted variants thereof (e.g. 2-methyl-phenyl, xylyl, tolyl, etc.), $C_4$-$C_{60}$ aromatic rings, $C_4$-$C_{20}$ aromatic rings, etc. The cyclic groups can optionally include heteroatoms (e.g., nitrogen, oxygen, or sulfur) replacing at least one carbon atom in the cyclic structure.

Examples of R and R' substituents can also include unsaturated alkyls, such as alkenyl and alkynyl groups, and their substituted analogues. An alkenyl group is a straight-chain, branched-chain, or cyclic hydrocarbon radical having one or more double bonds. Examples of suitable alkenyl groups can include ethenyl, allyl, 1,4-butadienyl, pentenyl, hexenyl, heptenyl, octenyl, methyl butenyl, ethyl pentenyl, cyclopropenyl, cyclobutenyl, cyclopentenyl, cyclohexenyl, cyclooctenyl, and their substituted analogues. Alkynyl groups are straight-chain, branched-chain, or cyclic hydrocarbon radicals having one or more triple bonds. Suitable alkynyl groups can include alkynyl groups analogous to the aforementioned alkenyls, such as pentynyl or hexynyl. Additional examples of R and R' substituents and their functional groups are discussed in greater detail below.

In some embodiments, the organophosphates are formed by reacting an alcohol (e.g., allyl alcohol, glycidol, ethanol, etc.) with phenyl dichlorophosphate (PO(OPh)Cl$_2$) in a tetrahydrofuran (THF) solution containing triethylamine (NEt$_3$). The organophosphates can also be prepared in a process wherein the alcohol is reacted with diphenyl phosphite (P(OPh)$_2$H) and titanium iso-propoxide (Ti(O(Pr)$_4$) in benzene to produce an intermediate, which is reacted with thionyl chloride (SOCl$_2$) and carbon tetrachloride (CCl$_4$) over a range of approximately 0° C. to room temperature (RT). Both of these reactions result in organophosphates having a phenyl (Ph) R substituent and an R' a substituent provided by the alcohol starting material. For example, when the alcohol is allyl alcohol, R' is allyl (—CH$_3$CH$_2$=CH$_2$) Likewise, when the alcohol is glycidol, R' is methyloxirane (—CH$_3$CHCH$_2$O).

The organophosphonates can be prepared in a process wherein an organohalide (e.g., allyl chloride, epichlorohydrin, 2-chloroethyl acrylate, chloroethane, etc.) is reacted with triphenyl phosphite (P(OPh)$_3$) while refluxing in toluene or microwaving in ethanol. Phosphorus pentachloride (PCl$_5$) can then be added to the reaction. Alternatively, the reaction with P(OPh)$_3$ can be quenched by addition of a base (e.g., sodium hydroxide (NaOH)), followed by addition of SOCl$_2$. Either procedure results in an organophosphonate where R is a phenyl (Ph) substituent, and R' is a substituent provided by the organohalide starting material. This is analogous to the R' substituents provided by the alcohols in the aforementioned synthesis of organophosphates.

It should also be noted that, in the preceding reactions to form organophosphates and organophosphonates, the phosphite (P(OPh)$_2$H and P(OPh)$_3$) or dichlorophosphate (PO (OPh)C$_{12}$) starting materials can optionally be replaced by organophosphorus compounds having substituents other than phenyl (e.g., alkyls or alkenyls). Additional examples of substituents that can replace Ph include substantially the same substituents as R and R', which are discussed in greater detail above. Using phosphite or dichlorophosphate compounds with alternative substituents results in the formation of organophosphorus compounds having the corresponding R groups. Further, it should be noted that provision of the organophosphorus compound at step 125 can optionally be carried out prior to or concurrently with provision of the biobased compounds at steps 110 and/or 120.

The biobased dicarboxylic acids and/or derivatives are reacted with the organophosphorus compounds in order to form biobased flame retardants. This is illustrated at step 130. Reactions between the organophosphorus compounds and the biobased compounds result in biobased flame retardants having organophosphorus ligands with R and R' substituents. For example, reacting the biobased compounds with phosphate or phosphonate esters such as those illustrated above results in biobased flame retardants having organophosphorus ligands. These ligands can be represented, respectively, by the following formulas:

where R and R' correspond to R and R' substituents on the organophosphorus starting materials, and the dotted lines represent bonds to oxygen atoms that were hydroxyl oxygen atoms on the biobased starting material (e.g., malic acid or a hydroxylated derivative of a dicarboxylic acid). In other embodiments, the biobased compounds can be reacted with a compound such as POCl$_3$ to form a biobased flame retardant having a central organophosphorus moiety. This and other examples are discussed in greater detail with respect to FIGS. 5A-6B.

The organophosphorus ligands replace hydroxyl hydrogen atoms on the biobased compounds. Therefore, the number of organophosphorus ligands on a biobased flame retardant depends upon the number of hydroxyl groups on the biobased compound starting material. For example, malic acid can be reacted to form a biobased flame retardant having a single organophosphorus ligand, while 1,2,4-butanetriol can be reacted to form a biobased flame retardant with three organophosphorus ligands. Malic acid, 1,2,4-butanetriol, and other biobased compounds are illustrated in FIG. 2.

Biobased flame retardants having four organophosphorus ligands can also be formed from tetrahydroxy derivatives formed at step 120. This is discussed in greater detail with respect to FIG. 3. In some embodiments, biobased flame retardants having more than one type of organophosphorus ligand are formed. For example, the reaction stoichiometry can be controlled to provide ligands having different R and/or R' substituents, as well as different organophosphorus esters (e.g., one phosphate and one phosphonate).

Both the number of organophosphorus ligands and the selection of R and R' substituents determine what types of processes can be carried out with the resulting biobased flame retardants. For example, some R and R' substituents enable covalent binding of the biobased flame retardants to a polymer matrix (e.g., as a crosslinker or as a reactive flame retardant bound to a single location on the polymer backbone). Additionally, some R and R' substituents have functional groups that allow polymerization of the biobased flame retardant. R and R' substituents having functional groups that can participate in covalent binding to a polymer matrix and/or polymerization reactions (e.g., functional groups such as aldehydes, halides, epoxies, esters, ethers, ketones, carboxylates, hydroxyl, vinyl, carbonate, imines, imides, amines, amides, thiols, etc.) are referred to herein "reactive substituents". Processes involving the biobased flame retardants are discussed in greater detail below with respect to step 150.

R and R' substituents that are not used to provide functionality involving polymerization or covalent binding to a polymer matrix are referred to herein as "unreactive substituents". Flame retardants having unreactive substituents can be used as additive flame retardants. The unreactive substituents can include alkyl and aryl groups, which can optionally have relatively unreactive functional groups, such as thioether, ether, ketone, alkoxies, etc. It should be noted that whether or not a substituent is reactive with respect to a class of polymer can depend upon its substituents, co-reactants, and reaction conditions, as will be understood by a person of ordinary skill in the art.

Additional reactions can optionally be carried out to modify reactive R and R' substituents on the biobased flame retardants. This is illustrated at step 140. These modifications are optionally selected to tune properties (e.g., reactivity, size/shape, solubility, flame retardancy, etc.) of the biobased flame retardants. A variety of modification reactions can be carried out, depending upon the functionality of the initial biobased flame retardant. For example, when R' is methyloxirane, epoxy can be converted to propylene carbonate via reaction with lithium bromide (LiBr) and carbon dioxide ($CO_2$). When R' is allyl, its' vinyl group can react with a thiol (e.g., 3-mercaptopropionate, 2-mercaptoethanol, cysteamine hydrochloride, alkyl thiols, alkyl thiols having organophosphorus moieties, etc.) to form thioether substituents. These thiol reactions can be carried out in methanol under ultraviolet (UV) light. Vinyl groups or other carbon-carbon double bonds can also be converted to epoxy groups in reactions with meta-chloroperoxybenzoic acid, peroxybenzoic acid, or peracetic acid.

Additional modifications can be carried out on a variety of biobased flame-retardant compounds' R and R' substituents. For example, aldehyde groups can be converted into functionalities that include vinyl groups, esters, and carboxylic acids using techniques known in the art. Additionally, aldehyde groups can be converted to imines by reactions with amines (e.g., aryl or alkyl amines, vinyl amines, or ammonia). However, step 130 is omitted from process 100 in some embodiments. In these instances, the biobased flame retardants formed at step 120 can be incorporated into polymers without modification.

Flame-retardant polymers that include the modified or unmodified biobased flame retardants can be formed. This is illustrated at step 150. A variety of flame-retardant polymers can be formed, depending upon the selection of biobased flame retardants and co-reactants. Examples of polymers that can be made flame-retardant by incorporation of the biobased flame retardants can include polystyrenes, epoxide resins, polyhydroxyurethanes, polycarbonates, polyesters, polyacrylates, polyimides, polyamides, polyureas, poly(vinyl-esters), and mixtures, co-polymers, or prepolymers thereof. These polymers can be biobased or non-biobased (e.g., petrochemical) polymers. The polymers can also be made from a mixture of biobased and non-biobased starting materials. In some embodiments, the polymers have number average molecular weights ($M_N$) between about 2,000 g/mol and 25,000 g/mol (e.g., about 4400 g/mol, about 10,000 g/mol, about 22,000 g/mol, etc.), though any conventional polymers can be used (e.g., where $M_N$ ranges from about 22,000 g/mol-1,000,000 g/mol or about 1,000,000 g/mol-2,000,000 g/mol). Examples of polymers are discussed in greater detail below.

In some embodiments, the biobased flame retardants bind to polymer chains when blended during processing of the polymer (e.g., in solution, in bulk, or in an extruder). Depending upon the number of reactive functional groups, the flame retardant can bind to one or more locations within the polymer matrix. In some embodiments, the flame retardants are crosslinkers. The degree of crosslinking can be tuned by increasing or decreasing the number of reactive substituents.

The biobased flame retardants can also covalently bind to prepolymers (e.g., monomers or systems of monomers). Polymerization of these prepolymers results in a flame-retardant polymer that includes the covalently-bound biobased flame retardants. Classes of polymers, prepolymers, and monomers that can react with biobased flame retardants having reactive substituents can include epoxy resins, acrylates with pendant or terminal alkenes, unsaturated fatty acids, polyurethane prepolymer mixtures, polybutadienes (e.g., cis-, trans-, or cis/trans-polybutadienes; predominately vinylic polybutadienes; polycyclohexadienes; polychloroprenes; poly-2-phenylbutadienes; poly-isoprenes; poly(butadiene-block-styrene); polybutadienes having terminal nucleophilic groups such as hydroxyl, thiol, or amine; poly(butadiene-co-acrylonitrile); poly(acrylonitrile-butadiene-styrene); etc.), synthetic rubbers (e.g., poly(ethylene-co-propylene-co-5-methylene-2-norbornene) or ethylene propylene diene monomer (EPDM) rubber), etc.

In some embodiments, the biobased flame retardants have R and R' substituents that are unreactive with respect to a polymer. For example, R and R' can be unsubstituted alkyl groups. In these instances, flame-retardant polymers can be formed by blending the biobased flame retardant with a monomer solution, a bulk polymer, or a prepolymer. This can occur at room temperature or with heat. The biobased flame retardants can be added in any appropriate amount, such as a weight percent (wt %) of about (~) 0.01-0.99 wt %, ~1-5 wt %, ~4-8 wt %, ~5-20 wt %, or ~10-40 wt %. The amount of biobased flame retardant incorporated into the polymer is selected based upon the intended flame retardancy and other properties (e.g., mechanical and/or electrical properties) of the polymer.

In other embodiments, flame-retardant polymers can be formed via polymerization of the biobased flame retardants. The resulting polymers can be homopolymers, block copolymers, random copolymers, or graft copolymers. There are a variety of polymerization processes that can be used to form these flame-retardant polymers. In some embodiments, biobased flame retardants having acetoxy R and R' substituents are homopolymerized in a titanium-catalyzed polymerization reaction. In other embodiments, biobased flame retardants having propylene carbonate substituents can be reacted in a ring-opening polymerization initiated by a base. Examples of bases that can be used as initiators can include NaOH, potassium hydroxide (KOH), lithium hydroxide (LiOH), 1,8-diazabicyclo[5.4.0]undec-7-ene (DBU), triazabicyclodecene (TBD), alkoxide or acetate bases, etc. Biobased flame retardants having epoxy groups can also be catalytically homopolymerized, or polymerized with co-monomers such as amines, acids, phenols, alcohols, and/or thiols, under basic conditions.

Figure 7:
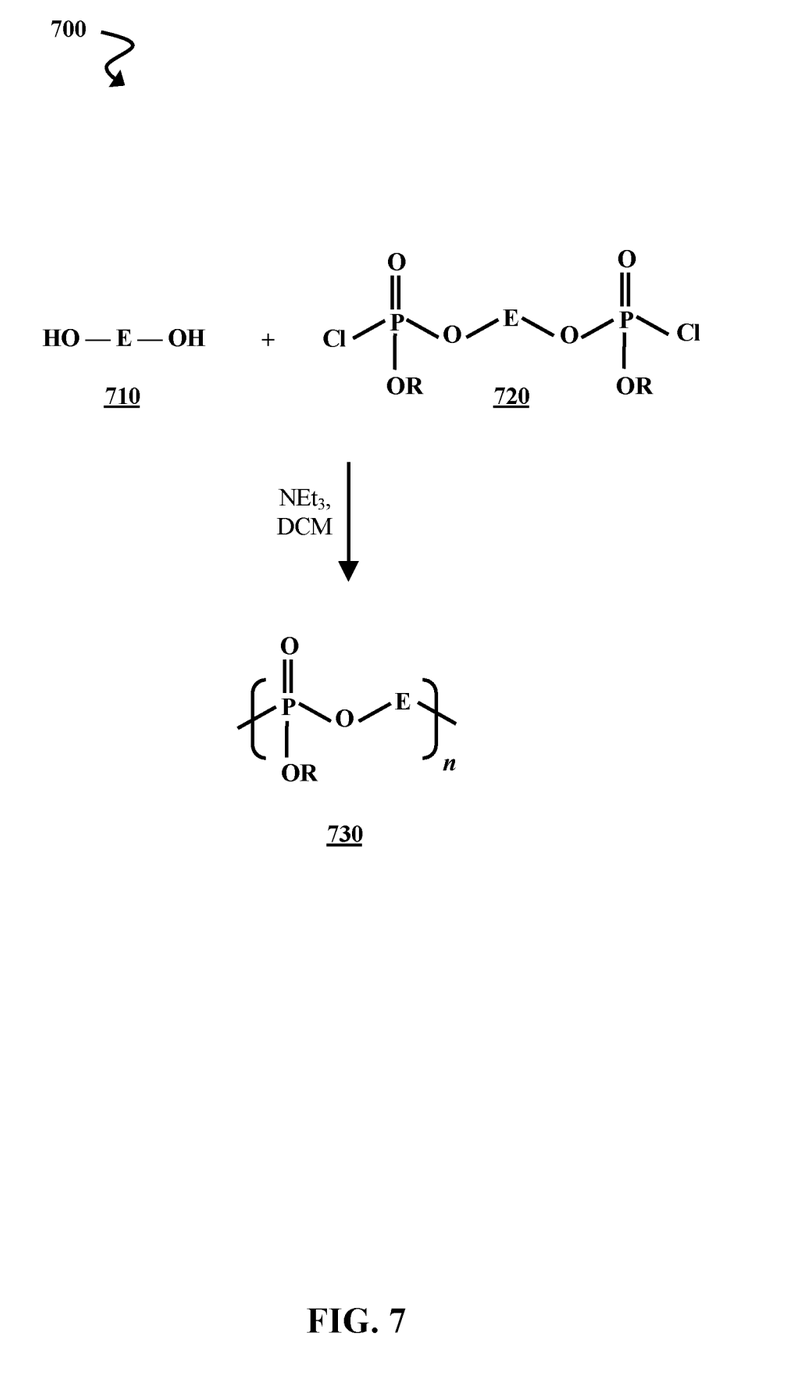
FIG. 7 is chemical reaction diagram illustrating a process of reacting a dihydroxy biobased flame retardant with a di(chlorophosphate) biobased flame retardant, according to some embodiments of the present disclosure.

Biobased flame retardants having vinyl moieties (e.g., where R and/or R' are allyl substituents) can be polymerized via radical polymerization. In some embodiments, biobased flame retardants having vinyl groups can be catalytically polymerized with a Ziegler-Natta catalyst. Examples of these catalysts can include heterogeneous Ziegler-Natta catalysts based on titanium compounds and homogeneous Ziegler-Natta catalysts based on complexes of titanium, zirconium, or hafnium. Heterogeneous and homogeneous Ziegler-Natta catalysts can be used in combination with organoaluminum co-catalysts in some embodiments. An additional example of a polymerization reaction is illustrated in FIG. 7.

Additional materials may be added to the flame-retardant polymers. For example, various crosslinkers can be added. Examples of crosslinking chemistries can include sulfur vulcanization and reactions with peroxides, such as tert-butyl perbenzoate, dicumyl peroxide, benzoyl peroxide, and di-tert-butyl peroxide. Other materials that may be blended with the compounds and polymers described herein can include additives such as anti-oxidants, glass fillers, carbon fillers, anti-drip agents, anti-static agents, branching resins, impact-modifiers, plasticizers, lubricants, mold release agents, and/or molecular weight regulators.

In some embodiments, the resulting flame-retardant polymers can form all or part of a material such as a plastic, laminate, synthetic fiber, insulation, paint, coating, foam, adhesive, or synthetic rubber. These can be incorporated into devices with electronic components (e.g., printed circuit boards (PCBs), semiconductors, transistors, optoelectronics, capacitors, resistors, chip carriers, etc.). Further, the flame-retardant materials can be used in integrated circuit packages and other electronics hardware applications, as well as articles such as upholstered furniture, automotive cushioning, interior textiles, thermal insulation, packing material, acoustic-dampening foams, etc.

FIG. 2 is a chemical reaction diagram illustrating processes 200 of forming di- and trihydroxy derivatives of biobased dicarboxylic acids, according to some embodiments of the present disclosure. Four biobased dicarboxylic acids are illustrated in FIG. 2: fumaric acid 210, maleic acid 220, malic acid 230, and succinic acid 240, which can be formed by hydrogenation of fumaric acid 210 in tetrahydrofuran (THF) or another appropriate solvent (e.g., diethyl ether). In the illustrated processes 200, this hydrogenation reaction is carried out using a palladium-on-carbon (Pd/C) catalyst in the presence of hydrogen gas ($H_2$). However, other alkene hydrogenation catalysts can be used in some embodiments, such as platinum dioxide ($PtO_2$), Raney nickel (Ra-Ni), or Wilkinson's catalyst (chloridotris(triphenylphosphine)rhodium(I)). The biobased dicarboxylic acids 210, 220, 230, and 240 are reacted with lithium aluminum hydride ($LiAlH_4$) in a diethyl ether ($Et_2O$) solution to produce polyols: trans-2-butene-1,4-diol 250, 1,4-butanediol 260, cis-2-butene-1,4-diol 270, and 1,2,4-butanetriol 280, respectively.

FIG. 3 is a chemical reaction diagram illustrating processes 300 of forming biobased flame retardants, according to some embodiments of the present disclosure. The biobased flame retardants can be formed from biobased compounds fumaric acid 210, maleic acid 220, trans-2-butene-1,4-diol 250, and cis-2-butene-1,4-diol 270 illustrated in FIG. 2. Examples of these biobased compounds 210, 220, and 250 having alkene moieties are represented in FIG. 3 as a generic biobased compound 310 having substituents, M. When the biobased compound 310 is fumaric acid 210 or maleic acid 220, M is a carboxylate group (—COOH), and when the biobased compound 310 is trans-2-butene-1,4-diol 250 or cis-2-butene-1,4-diol 270 (not shown), M is a hydroxymethyl group (—$CH_2OH$).

The alkene moiety on the biobased compound 310 is converted to an epoxy group. When M is carboxylate (e.g., fumaric acid 210 or maleic acid 220), an aqueous solution containing approximately 1.5 equivalents (eq.) NaOH is added to an aqueous solution of the biobased compound 310. A catalytic amount of sodium tungstate ($Na_2WO_4$) is added after the resulting mixture has been heated to approximately 65° C. While stirring, about 2 eq. hydrogen peroxide ($H_2O_2$) are added to the hot solution. Prior to its addition, the $H_2O_2$ can be in a ~30% aqueous solution, but other concentrations of $H_2O_2$ can be used as well. The reaction mixture is cooled to room temperature after stirring for about an hour. While cooling, an epoxide derivative 320 where M is carboxylate precipitates, and can separated by filtration followed by drying (e.g., under vacuum).

When M is hydroxymethyl (e.g., trans-2-butene-1,4-diol 250 or cis-2-butene-1,4-diol 270), the biobased compound 310 is reacted with meta-chloroperoxybenzoic acid (mCPBA) in dichloromethane (DCM) and water ($H_2O$). Sodium bicarbonate ($NaHCO_3$) can optionally be added to the mixture in order to increase the reaction speed. In some embodiments, mCPBA can be replaced by another peroxyacid, such as peroxybenzoic acid or peracetic acid. The reaction forms an epoxide derivative 320 where M is hydroxymethyl, which is extracted in DCM.

Additional reactions are then carried out on the epoxide derivative 320. In some embodiments, an aqueous acid ($H_3O^+$) is added to a solution that includes the epoxide derivative 320 where M is carboxylate, the epoxide derivative 320 where M is hydroxymethyl, or a mixture that includes both epoxide derivatives 320. The resulting acid-catalyzed epoxide ring-opening reactions produce derivatives having hydroxyl groups 330. Depending upon the epoxide derivative 320 starting material, the hydroxylated derivative 330 can be a dihydroxy derivative (when M is carboxylate) or a tetrahydroxy derivative (when M is hydroxymethyl).

In other embodiments, the epoxide derivative 320 is reacted with a chlorophosphate ester (Cl-L, where L is an organophosphate moiety) to form a biobased epoxide flame retardant 340. The illustrated organophosphate L group has two substituents, R and R'. Examples of R and R' substituents are discussed in greater detail with respect to FIG. 1. In some embodiments, R and R' are the same functional group, though they can also be different groups (e.g., where R is phenyl and R' is an allyl group). Additionally, the chlorophosphate ester can be replaced by another organophosphorus chloride compound (e.g., a chlorophosphonate ester). When M is carboxylate, the epoxide derivative 320 and Cl-L are reacted with magnesium oxide, resulting in an epoxide flame retardant 340 (top) with ester linking groups. However, when M is hydroxymethyl, either catalytic dimethylaminopyridine (DMAP) or stoichiometric triethylamine ($NEt_3$) is added to the reaction with Cl-L, resulting in an epoxide flame retardant 340 (bottom) with methyleneoxy linking groups.

FIGS. 4A and 4B are chemical reaction diagrams illustrating processes 400 and 405 of forming a monohydroxy biobased flame retardant, according to some embodiments of the present disclosure. Process 400 is an epoxide ring-opening reaction that converts an epoxide flame retardant 340 (illustrated in FIG. 3) into the monohydroxy flame retardant 410 (referred to herein as monohydroxy flame retardant A 410). The epoxide ring-opening reaction is an acid-catalyzed reaction carried out under conditions substantially similar to the epoxide ring-opening reaction used to form the hydroxylated derivative 330 illustrated in FIG. 3.

For simplicity, the epoxide flame retardant 340 and monohydroxy flame retardant A 410 are illustrated with methyleneoxy (—$OCH_2$—) groups linking the phosphate L substituents to the rest of the molecule. That is, the illustrated epoxide flame retardant 340 starting material is the result of a reaction in process 300 (FIG. 3) involving the epoxide derivative 320 having hydroxymethyl M groups. However, it should be understood that process 400 can be carried out on any of the epoxide flame retardants 340 illustrated in FIG. 3. Therefore, the monohydroxy flame retardant A 410 can have methyleneoxy or ester moieties.

In process 405, a protecting group is attached to the hydroxyl group on malic acid 230 (illustrated in FIG. 2). Any appropriate reagent for providing a protecting group can be used. For example, malic acid 230 can be reacted with an acetyl halide (e.g., acetyl chloride) in the presence of a base (e.g., NEt₃), resulting in an acetoxy protecting group at the deprotonated hydroxyl. An acetoxy group can also be attached by reacting malic acid 230 with acetic anhydride in the presence of a catalytic amount of pyridine and/or DMAP. Additional protecting groups that may be attached can include benzoyl, benzyl, silyls (e.g., tert-butyldimethylsilyl (TBS), triisopropylsilyl (TIPS), trimethylsilyl (TMS), and triethylsilyl (TES)), methoxymethyl ether (MOM), and tetrahydropyranyl (THP).

The protection step results in a hydroxyl-protected malic acid compound (not shown). In the second step of process 405, this compound is reacted with MgO and an organophosphorus compound, Cl-L, where L is a phosphate moiety (illustrated in FIG. 3) or another organophosphorus moiety (e.g., phosphonate or phosphinate). This step results in a protected flame-retardant intermediate (not shown), which is deprotected in the third step of process 405. A mild acid or base can be added to remove the protecting group. Additionally, silyl protecting groups can be deprotected by addition of a fluoride compound, such as tetrabutylammonium fluoride (TBAF). The deprotection step results in a monohydroxy flame retardant having ester moieties 420, which is referred to herein as monohydroxy flame retardant B 420.

Figure 5A:
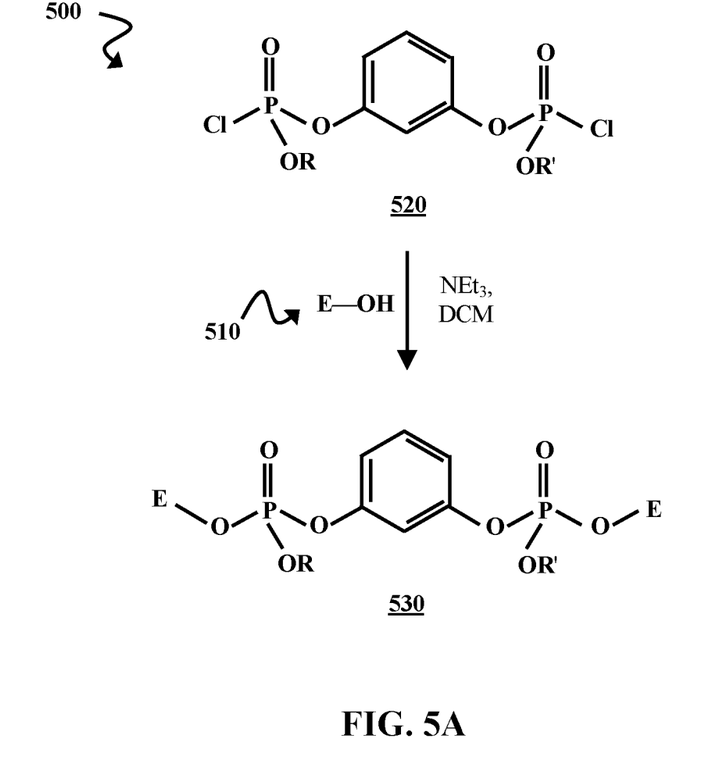
FIGS. 5A and 5B are chemical reaction diagrams illustrating processes of forming additional biobased flame retardants from monohydroxy flame retardants, according to some embodiments of the present disclosure.
Figure 5B:
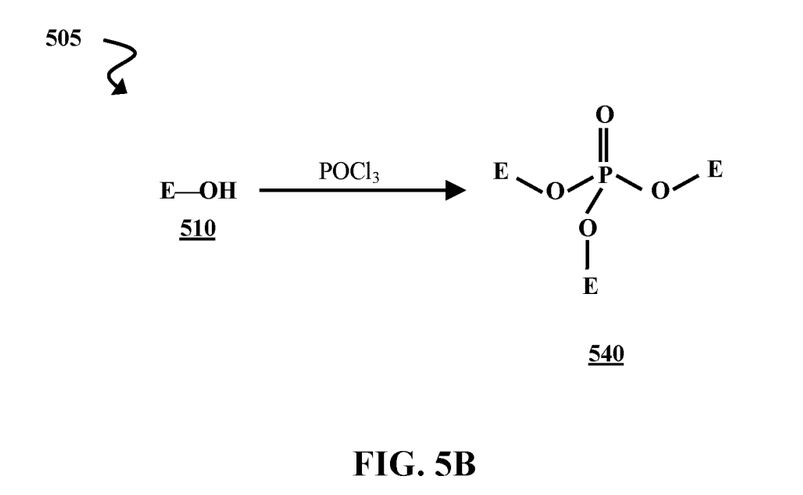

FIGS. 5A and 5B are chemical reaction diagrams illustrating processes 500 and 505 of forming additional biobased flame retardants from monohydroxy flame retardants A 410 and B 420, according to some embodiments of the present disclosure. These monohydroxy flame retardants 410 and 420 (illustrated in FIGS. 4A and 4B) are represented in FIGS. 5A and 5B by a generic monohydroxy flame retardant 510: E-OH, where E represents the non-hydroxyl portions of the flame-retardant molecule. In some embodiments, only one type of monohydroxy flame retardant 510 is used. However, processes 500 and 505 can also be carried out with a mixture of two or more monohydroxy flame retardants 510 (e.g., 410 and/or 420, optionally with varying L substituents).

Process 500 is a reaction between the monohydroxy flame retardant 510 and a resorcinol bis(chlorophosphate) compound 520 having R and R' substituents on its chlorophosphate moieties. In some embodiments, R and R' are phenyl substituents, though R and R' can be any appropriate reactive (e.g., allyl or epoxy) and/or unreactive substituents (e.g., alkyl or aryl). Examples of these substituents are discussed in greater detail with respect to FIG. 1. The monohydroxy flame retardant 510 and the resorcinol bis(chlorophosphate) compound 520 are combined with a stoichiometric amount of NEt₃ in DCM, though a catalytic amount of DMAP can be used instead of the NEt₃. This results in a compound referred to herein as a resorcinol bis(phosphate-E) flame retardant 530. In some embodiments the resorcinol bis(chlorophosphate) compound 520 can be replaced by resorcinol bis(dichlorophosphate), resulting in an analogous product having four E moieties.

In process 505, a DCM solution containing POCl₃ is prepared. About 3 eq. of monohydroxy flame retardant 510 are then added to the solution. The resulting reaction produces a flame-retardant phosphate ester 540 having three moieties (E) provided by monohydroxy flame retardant 510. Flame-retardant organophosphorus esters other than the flame-retardant phosphate ester 540 (e.g., phosphinate esters or phosphonate esters) can also be formed if POCl₃ is replaced by a reactant such as phenylphosphonic dichloride or diphenylphosphinic chloride.

Figure 6A:
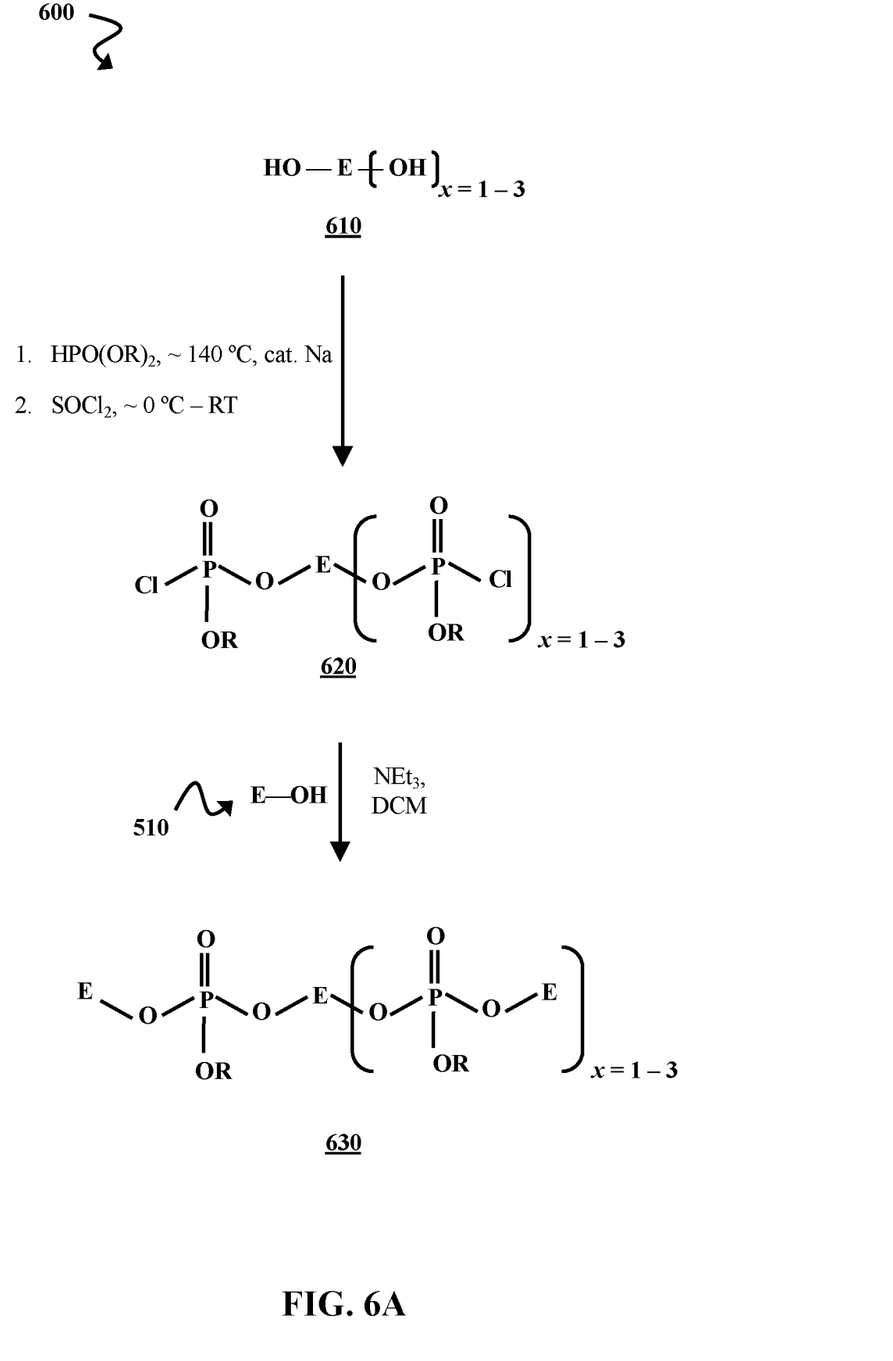
FIG. 6A is a chemical reaction diagram illustrating an additional process of forming flame retardants from hydroxylated derivatives of biobased dicarboxylic acids, according to some embodiments of the present disclosure.

FIG. 6A is a chemical reaction diagram illustrating an additional process 600 of forming flame retardants from hydroxylated derivatives of biobased dicarboxylic acids, according to some embodiments of the present disclosure. The di-, tri-, and/or tetrahydroxy derivative starting materials are represented by a generic polyhydroxy derivative 610, HO-E-(OH)$_x$, where x is 1, 2, or 3 and E represents the non-hydroxyl portions of the derivative molecules (illustrated in FIGS. 2 and 3). For example, when the polyhydroxy derivative 610 is a dihydroxy biobased compound (e.g., 2-butene-1,4-diol 250; 1,4-butanediol 260; 2-butene-1,4-diol 270 (FIG. 2); or the hydroxylated derivative 330 where M is carboxylate (FIG. 3)), x is 1. Similarly, when the polyhydroxy derivative 610 is 1,2,4-butanetriol 280 (FIG. 2), x is 2, and when the polyhydroxy derivative 610 represents the hydroxylated derivative 330 where M is hydroxymethyl (FIG. 3), x is 3.

Process 600 includes a first step in which at least 2 eq. of an organophosphite, HPO(OR)₂, (e.g., diphenyl phosphite, dimethyl phosphite, diethyl phosphite, dibutyl phosphite, dibenzyl phosphite, di-tert-butyl phosphite, etc.) and a catalytic amount of sodium (Na) are added to a solution of the polyhydroxy derivative 610. The mixture is heated to about 140° C., and allowed to react until an esterification reaction between the disubstituted phosphite and the polyhydroxy derivative 610 is substantially complete. The mixture is then cooled to approximately 0° C., and thionyl chloride (SOCl₂) is added to the reaction. The reaction mixture is warmed to room temperature, at which point a biobased flame retardant 620 having 2, 3, or 4 chlorophosphate groups can be separated out of the reaction mixture (e.g., by extraction and/or solvent removal).

Process 600 can continue with a step in which biobased flame retardant 620 is combined with a stoichiometric amount of NEt₃ and at least 2 eq. of monohydroxy flame retardant 510 (FIG. 5) in DCM. In some embodiments, a catalytic amount of DMAP is used instead of the NEt₃. The resulting flame retardant 630 has 2, 3, or 4 moieties (E) provided by monohydroxy flame retardant 510. However, biobased flame retardant 620 can optionally be added to a polymer or reacted further using various techniques. An additional example of a reaction involving biobased flame retardant 620 is illustrated in FIG. 7.

Figure 6B:
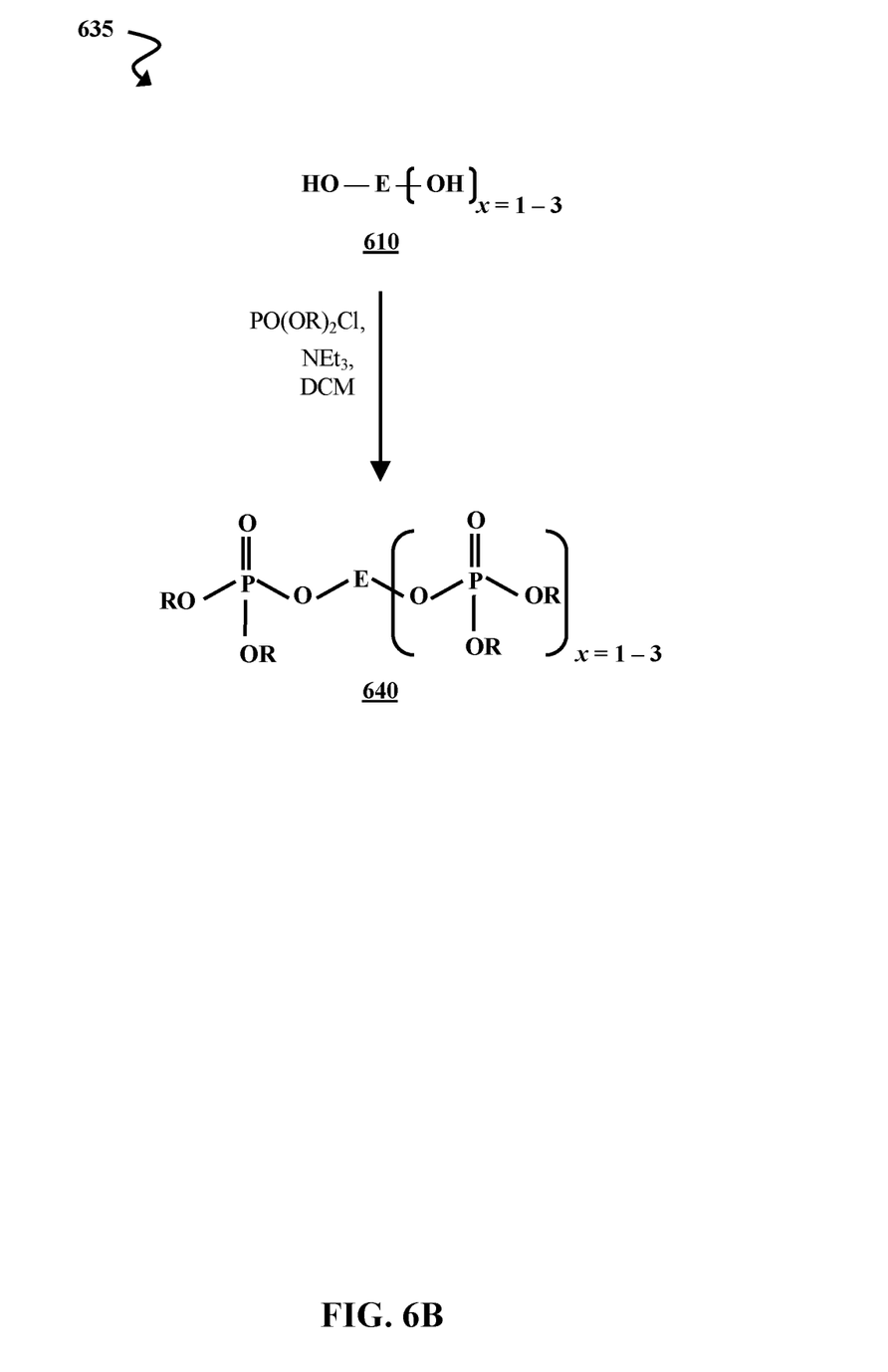
FIG. 6B is a chemical reaction diagram illustrating another process of forming flame retardants from hydroxylated derivatives of biobased dicarboxylic acids, according to some embodiments of the present disclosure.

FIG. 6B is a chemical reaction diagram illustrating another process 635 of forming biobased flame retardants from hydroxylated derivatives of biobased dicarboxylic acids, according to some embodiments of the present disclosure. In process 635, at least 2 eq. of disubstituted chlorophosphate (PO(OR)₂C₁) (e.g., diphenyl chlorophosphate, dimethyl chlorophosphate, diethyl chlorophosphate, dibutyl chlorophosphate, dibenzyl chlorophosphate, di-tert-butyl chlorophosphate, etc.) are added to a solution of a polyhydroxy derivative 610. The polyhydroxy derivative 610 is discussed in greater detail with respect to FIG. 6A.

A DCM solution containing at least 2 eq. of monohydroxy flame retardant 510 (FIG. 5) and a stoichiometric amount of NEt₃ is added to the reaction mixture. In some embodiments, a catalytic amount of DMAP is used instead of the NEt₃. Process 635 results in the formation of a biobased flame retardant 640 having 2, 3, or 4 phosphate ester moieties, depending on the number of hydroxyl groups on the polyhydroxy derivative 610 starting material. However, the phosphate esters can be replaced by other organophosphorus groups if an organophosphorus chloride compound other than the disubstituted chlorophosphate is used. For example, a disubstituted phosphinic chloride (POR$_2$Cl) (e.g., diphenylphosphinic chloride or dimethylphosphinic chloride) can replace the disubstituted chlorophosphate. In other embodiments, the disubstituted chlorophosphate or phosphinic chloride compounds can have two different substituted or unsubstituted alkyl substituents, R and R', rather than two R groups. Examples of R and R' groups are discussed in greater detail with respect to FIG. 1.

FIG. 7 is a chemical reaction diagram illustrating a process 700 of reacting a dihydroxy biobased derivative 710 with a di(chlorophosphate) biobased flame retardant 720, according to some embodiments of the present disclosure. The dihydroxy biobased derivative 710 and di(chlorophosphate) biobased flame retardant 720 are each represented by generic structures where E represents moieties derived from the biobased compounds. E moieties are discussed in greater detail above. The di(chlorophosphate) biobased flame retardant 720 can be any of the compounds represented by biobased flame retardant 620 (illustrated in FIG. 6A) where x=1. A DCM solution of NEt$_3$ is added to the reaction mixture, though catalytic DMAP can also be used. The reaction results in the formation of a biobased flame-retardant polymer 730 having n repeat units, where n is an integer greater than 1. For example, n can be an integer between 2 and 1,000,000 (e.g., about 2-25,000, about 500-25,000, about 1,000-25,000, about 2,000-25,000, about 5,000-25,000, about 25,000-50,000, about 50,000-500,000, etc.).

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the biobased flame retardants and/or polymers described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and ten-butyl).

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 25° C. unless otherwise indicated. Ranges (e.g., time, concentration, temperature, etc.) indicated herein include both endpoints and all numbers between the endpoints. Unless specified otherwise, the use of "about," "approximately," or a tilde (~) in connection to a range applies to both ends of the range (e.g., "approximately 1 g-5 g" should be interpreted as "approximately 1 g-approximately 5 g"). Unless otherwise indicated, modifying terms such as "about," "approximately," and "~" indicate +/−10% of a recited value, range of values, or endpoints of one or more ranges of values.

The processes discussed herein and their accompanying drawings are not to be construed as limiting. One skilled in the art would recognize that a variety of techniques may be used that vary in conditions, components, methods, etc., which ultimately generate biobased flame retardants and flame-retardant polymers containing biobased flame retardants. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may produce the biobased flame retardants and a second entity may produce the flame-retardant polymers.

What is claimed is:

1. A flame-retardant compound having the structure:

wherein each L is an organophosphorus moiety.

2. The flame-retardant compound of claim 1, wherein the flame-retardant compound is derived from malic acid.

3. The flame-retardant compound of claim 1, wherein the organophosphorus moiety has an organic substituent with a reactive functional group.

4. The flame-retardant compound of claim 3, wherein the reactive functional group is selected from the group consisting of an aldehyde, a halide, an epoxy, a carboxylate, a vinyl, a propylene carbonate, an imine, an imide, an amine, an amide, and a thiol.

5. The flame-retardant compound of claim 1, wherein the organophosphorus moiety has a formula selected from the group consisting of:

where R and R' are organic substituents.

6. The flame-retardant compound of claim 5, wherein at least one of the R and the R' is an alkyl substituent.

7. The flame-retardant compound of claim 5, wherein the at least one of the R and the R' is a substituent selected from the group consisting of a methyloxirane, an allyl, and a propylene carbonate.

8. An article of manufacture, comprising:
   a polymer; and
   a flame retardant, wherein the flame retardant is an additive flame retardant or covalently bound to the polymer, and wherein the flame retardant has the structure:

15 wherein each L is an organophosphorus moiety.

9. The article of manufacture of claim 8, further comprising an electronic component.

10. The article of manufacture of claim 8, wherein the polymer is selected from the group consisting of polystyrenes, epoxide resins, polyhydroxyurethanes, polycarbonates, polyesters, polyacrylates, polyimides, polyamides, polyureas, and poly(vinyl-esters).

11. The article of manufacture of claim 8, wherein the flame retardant is an additive flame retardant.

12. The article of manufacture of claim 8, wherein the flame retardant is covalently bound to the polymer.

13. The article of manufacture of claim 8, wherein the flame retardant is a monomer unit in the polymer.

14. A process, comprising:
providing a hydroxyl-protected biobased malic acid;
providing an organophosphorus compound;
reacting the organophosphorus compound and the hydroxyl-protected biobased malic acid to form a flame retardant intermediate; and

16 deprotecting the flame retardant intermediate to form a flame retardant having the following structure:

wherein each L is an organophosphorus moiety.

15. The process of claim 14, further comprising polymerizing the flame retardant.

16. The process of claim 14, further comprising blending the flame retardant with a polymer as an additive flame retardant.

17. The process of claim 14, further comprising covalently binding the flame retardant to a polymer.

18. The process of claim 14, further comprising carrying out a reaction involving at least one functional group on the flame retardant.

19. The process of claim 14, wherein the organophosphorus compound is selected from the group consisting of a chlorophosphate ester, a phosphonate ester, a phosphinate ester, and phosphorus oxychloride.

* * * * *